(12) United States Patent
Tochigi et al.

(10) Patent No.: US 8,253,904 B2
(45) Date of Patent: Aug. 28, 2012

(54) ANTIGLARE FILM, MANUFACTURING METHOD THEREOF AND TRANSMISSION TYPE LCD

(75) Inventors: Yusuke Tochigi, Tokyo (JP); Kae Takahashi, Tokyo (JP); Takahiro Morinaga, Tokyo (JP)

(73) Assignee: Toppan Printing Co., Ltd. (JP)

( * ) Notice: Subject to any disclaimer, the term of this patent is extended or adjusted under 35 U.S.C. 154(b) by 243 days.

(21) Appl. No.: 12/567,504

(22) Filed: Sep. 25, 2009

(65) Prior Publication Data

US 2010/0073611 A1 Mar. 25, 2010

(30) Foreign Application Priority Data

Sep. 25, 2008 (JP) ................................. 2008-246819

(51) Int. Cl.
*G02F 1/1335* (2006.01)

(52) U.S. Cl. ........................................................ 349/137

(58) Field of Classification Search ................. None
See application file for complete search history.

(56) References Cited

U.S. PATENT DOCUMENTS

| 5,847,795 A * | 12/1998 | Satoh et al. | 349/137 |
| 5,976,297 A * | 11/1999 | Oka et al. | 156/241 |
| 2006/0198021 A1* | 9/2006 | Fukuda et al. | 359/490 |

FOREIGN PATENT DOCUMENTS

| JP | 06-018706 | 1/1994 |
| JP | 11-160505 | 6/1999 |
| JP | 11-305010 | 11/1999 |
| JP | 2000-180611 | 6/2000 |
| JP | 2000-338310 | 12/2000 |
| JP | 2002-207109 | 7/2002 |
| JP | 2003-004903 | 1/2003 |
| JP | 2003-260748 | 9/2003 |
| JP | 2004-004777 | 1/2004 |

\* cited by examiner

*Primary Examiner* — Lucy Chien

(74) *Attorney, Agent, or Firm* — Squire Sanders (US) LLP

(57) ABSTRACT

The invention provides an antiglare film that has a low haze value, can maintain antireflection ability, and has inhibited reflection of external light, and also provides a manufacturing method thereof, and a transmission type liquid crystal display. The antiglare film includes a transparent substrate and an antiglare layer, wherein the antiglare layer is formed on the transparent substrate, has a concave-convex structure on the opposite surface of the antiglare layer from the transparent substrate, and includes a binder matrix and particles, the integrated reflectance of the antiglare layer at a wavelength of 550 nm is less than or equal to 4%, and a haze value of the antiglare layer is in the range of 3-15%.

20 Claims, 3 Drawing Sheets

ANTIGLARE FILM, MANUFACTURING METHOD THEREOF AND TRANSMISSION TYPE LCD

CROSS REFERENCE TO RELATED APPLICATION

This application is based on and claims the benefit of priority from the Japanese Patent Application No. 2008-246819, filed on Sep. 25, 2008, the entire contents of which are incorporated herein by reference.

BACKGROUND OF THE INVENTION

1. Field of the Invention

The present invention relates to an antiglare film, a manufacturing method thereof, and a transmission type liquid crystal display. In particular, the invention relates to an antiglare film that can be provided on the surface of a window or a display such as a liquid crystal display (LCD), a CRT display, an organic electroluminescence display (ELD), a plasma display (PDP), a surface emission display (SED), and a field emission display (FED).

2. Description of the Related Art

In the field of displays such as liquid crystal displays, CRT displays, EL displays, and plasma displays, an antiglare film having a concave-convex structure on the surface is known to be provided on the display surface in order to prevent the decrease in visibility caused by reflection of external light on the display surface during viewing.

For example, a method for forming a concave-convex structure on the surface of an antiglare film by emboss processing and a method of forming a concave-convex structure on the surface of an antiglare film by coating a coating liquid in which particles are admixed to a material forming a binder matrix and dispersing the particles in the binder matrix are known as methods for forming an antiglare film having a concave-convex structure on the surface. In the antiglare film in which a concave-convex structure formed by such methods is provided on the surface, the external light falling on the antiglare film is scattered by the concave-convex structure of the surface, the image of external light becomes blurred, and the decrease in visibility caused by reflection of external light on the display surface can be prevented.

JP-A-6-18706 discloses antiglare films of various forms in which particles are dispersed in a binder matrix. The antiglare films using the binder matrix and particles described in JP-A-6-18706 can be manufactured by a process including fewer steps than that using the above-described embossing and, therefore, the antiglare films can be produced at a lower cost.

A variety of techniques used to obtain antiglare films using a binder matrix and particles have been disclosed. For example, JP-A-2003-260748 discloses using a combination of a binder matrix resin, spherical particles, and irregular shape particles. JP-A-2004-004777 discloses using a binder matrix resin and particles of a plurality of different diameters. JP-A-2003-004903 discloses providing surface concavities and convexities and specifying the cross-sectional area of concavities.

JP-A-11-305010 discloses using internal scattering together with surface scattering, setting the internal haze value (cloudiness) of the antiglare layer to 1%-15% and setting the surface haze value (cloudiness) to 7%-30%. JP-A-2002-207109 discloses using a binder resin and particles with a diameter of 0.5 µm to 5 µm, setting the difference in refractive index between the binder resin and the particles to 0.02-0.2, and setting the compounding ratio of the particles to more than 10 parts by weight and less than 30 parts by weight per 100 parts by weight of the binder resin. JP-A-2000-338310 discloses using a binder resin and particles with a diameter of 1 µm to 5 µm, setting the difference in refractive index between the binder resin and the particles to 0.05-0.15, using an appropriate solvent, and setting the surface roughness within a predetermined range. JP-A-2000-180611 discloses using a binder resin and a plurality of particles and setting the difference in refractive index between the binder resin and the particles to 0.03-0.2. JP-A-11-160505 discloses setting the surface haze (cloudiness) to a value equal to or greater than 3 and setting the difference between a haze value in the normal direction and a haze value in the direction at $\pm 60°$ to a value of equal to or less than 4.

Antiglare films of various configurations developed to attain a variety of objects have thus been disclosed. Performance of antiglare films used on the front surface of display differs between the displays. In other words, an optimum antiglare film differs depending on the resolution and object of use of the display. Therefore, antiglare films of various types corresponding to a variety of objects are needed.

Antiglare films are provided on the surface of displays of notebook personal computers, desktop personal computers, and TV monitors. In recent years, antiglare films with a low haze value and inhibited antiglare ability have been used with the object of increasing contrast. The resultant problem is that reflection is increased and image recognizability is decreased. Accordingly, it has been suggested to laminate an antireflection layer on the antiglare layer. However, the problem arising when an antireflection layer is laminated on the antiglare layer is that material cost and number of processes are increased and cost is raised, while the production yield is degraded.

SUMMARY OF THE INVENTION

The invention provides an antiglare film that has a low haze value, can maintain antireflection ability, and has inhibited reflection of external light, a manufacturing method thereof, and a transmission type liquid crystal display.

A first aspect of the present invention is an antiglare film which has a transparent substrate and an antiglare layer, the antiglare layer being formed on the transparent substrate, having a concave-convex structure on the opposite surface of the antiglare layer from the transparent substrate, and including a binder matrix and particles, an integrated reflectance of the antiglare layer at a wavelength of 550 nm being less than or equal to 4%, and a haze value of the antiglare layer being in the range of 3-15%.

In addition, a second aspect of the present invention is the antiglare film according to the first aspect of the present invention, wherein a value $R_A/H$, which is obtained by dividing an average diameter of the particles by an average thickness H of the antiglare layer is in the 0.3-0.8 range, and a refractive index n of the binder matrix is less than or equal to 1.47.

In addition, a third aspect of the present invention is a polarizing plate which has the antiglare film according to the first aspect of the present invention and a polarizing layer formed on the opposite surface of the transparent substrate from the antiglare layer.

In addition, a fourth aspect of the present invention is a transmission type LCD which has the antiglare film according to the first aspect of the present invention, a first polarizing plate, a liquid crystal cell, a second polarizing plate, and a backlight unit, in the order of this description from an observer's side, the antiglare layer of the antiglare film being arranged as the surface of observer's side.

In addition, a fifth aspect of the present invention is a transmission type LCD which has a first polarizing plate, a liquid crystal cell, a second polarizing plate, and a backlight unit, in the order of this description from an observer's side, the antiglare layer of the antiglare film being arranged as the surface of observer's side, the first polarizing plate being the polarizing plate according to the third aspect of the present invention.

In addition, a sixth aspect of the present invention is a manufacturing method of an antiglare film including coating a coating liquid for forming an antiglare layer which contains particles and a binder matrix forming material which cures by ionizing radiation on the transparent substrate to form a coated layer, and exposing the coated layer to ionizing radiation to cure the binder matrix so that an antiglare film which has an integrated reflectance less than or equal to 4% at a wavelength of 550 nm and a haze value in the range of 3-15% is obtained.

In addition, a sixth aspect of the present invention is the manufacturing method according to the sixth aspect of the present invention, wherein the coated layer is formed by a die coating method.

In accordance with the present invention it is possible to provide an antiglare film that has a low haze value, can maintain antireflection ability, and has inhibited reflection of external light, a manufacturing method thereof, and a transmission type liquid crystal display.

DESCRIPTION OF REFERENCE NUMERALS AND SIGNS

100: Antiglare film.
110: First transparent substrate.
120: Antiglare layer.
121: Binder matrix.
122: Particle(s).
$R_A$: Average diameter of the particles.
H: Average thickness of the antiglare layer.
200, 300: Transmission type LCD.
210: First polarizing plate.
211: Second transparent substrate.
212: Third transparent substrate.
213: First polarizing layer.
220: Liquid crystal cell.
230: Second polarizing plate.
231: Fourth transparent substrate.
232: Fifth transparent substrate.
233: Second polarizing layer.
240: Backlight unit.
410: Third polarizing plate.
400: Die coater.
310: Die head.
320: Pipework.
330: Coating liquid tank.
340: Transfer pump.
350: Rotary roll.

DETAILED DESCRIPTION OF THE INVENTION

Embodiments of the invention will be described below with reference to the drawings. In the embodiments like constituent elements will be assigned with like reference symbols, and redundant explanation in the embodiments will be omitted.

Figure 1:
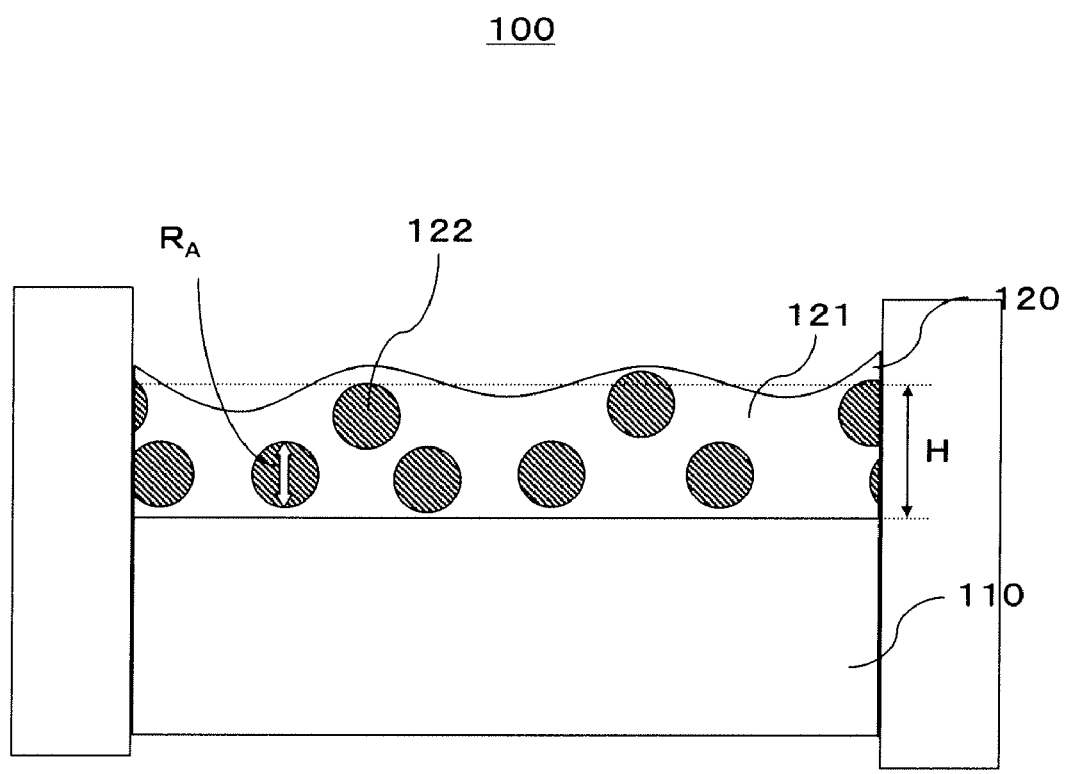
FIG. 1 is a schematic cross-sectional view of the antiglare film of an embodiment of the invention.

FIG. 1 is a schematic cross-sectional view illustrating an antiglare film of an embodiment of the invention. As shown in FIG. 1, an antiglare film 100 of the embodiment of the invention is provided with an antiglare layer 120 on a first transparent substrate 110. In the antiglare film 100, a concave-convex structure is formed on the surface of the antiglare layer 120.

Because the concave-convex structure is provided on the surface of the antiglare layer 120 in the antiglare film 100 of the embodiment of the invention, the external light falling on the surface of the antiglare film 100 is scattered and the image of external light reflected by the surface of the antiglare film 100 is blurred. In a case where the antiglare layer 120 is composed of a binder matrix 121 and particles 122, the particles 122, individually or by aggregates of a plurality thereof, form a concave-convex structure on the surface, thereby forming concavities and convexities of the surface of the antiglare layer 120.

A specific feature of the antiglare film 100 of the embodiment of the invention is that the antiglare layer 120 is provided on the first transparent substrate 110, the antiglare layer 120 is positioned on the outermost surface of the antiglare film 100, and an integrated reflectance on the surface of the antiglare layer 120 at a wavelength of 550 nm is less than or equal to 4%. Because the integrated reflectance on the surface of the antiglare layer 120 at a wavelength of 550 nm is made less than or equal to 4%, it is possible to obtain the antiglare film 100 that has sufficient antiglare ability even though this antiglare film 100 has a haze value of the antiglare film 120 as low as 3-15%.

The inventors have found that the reflection of external light can be efficiently prevented, without laminating an antireflection layer, in the high-contrast antiglare film 100 in which the antiglare layer 120 is located on the outermost surface and the antiglare layer 120 has a low haze value in the range of 3-15% by making the integrated reflectance of the surface of the antiglare layer 120 at a wavelength of 550 nm less than or equal to 4%, and this finding led to the creation of the invention. This is apparently because by decreasing the integrated reflectance, it is possible to reduce the reflection and enhance the antiglare ability.

In the antiglare film 100 of the embodiment of the invention, the antiglare layer 120 is located on the outermost surface. The antiglare film 100 in which the antiglare layer 120 is located on the outermost surface as referred to herein is the antiglare film 100 that has no antireflection layer preventing the reflection of external light. The antiglare film 100 of the embodiment of the invention is the antiglare film 100 provided with antiglare ability because it has a function of preventing the reflection of external light, while having no antireflection layer. Because no antireflection layer is present, the antiglare film 100 can be manufactured at a low cost.

A specific feature of the antiglare film 100 of the embodiment of the invention is that the integrated reflectance on the surface of the antiglare layer 120 at a wavelength of 550 nm is less than or equal to 4%. In a case where the integrated reflectance on the surface of the antiglare layer 120 at a wavelength of 550 nm is more than 4%, the antiglare film 100 with a haze value of the antiglare layer 120 in the range of 3-15% cannot be obtained as an antireflection film having sufficient antiglare ability. It is preferred that the integrated reflectance on the surface of the antiglare layer 120 at a wavelength of 550 nm be as low as possible, and a range of 2.5-4% is more preferred. In a case where the integrated reflectance on the surface of the antiglare layer 120 at a wavelength of 550 nm is less than 2.5%, the antiglare layer 120 has to have a new low-refractive material and the cost is increased.

As for the integrated reflectance of the antiglare film 100, the surface of the first transparent substrate 110 on which the antiglare layer 120 has not been laminated was rubbed with a sandpaper and coated with a non-glossy black paint and then light with a wavelength of 550 nm was used, the light incidence angle was set to 5°, the antiglare film 100 was set in an integration sphere, and the integrated reflectance of the antiglare layer 120 was measured using U-4100 produced by Hitachi High-Tech Corp. By using the integration sphere, it is possible to measure the total reflectance of the antiglare layer provided with a concave-convex structure on the surface and to find the integrated reflectance.

The inventors have discovered an antiglare film in which improved antiglare ability is obtained without laminating an antireflective layer when the antiglare layer 120 in the antiglare film 100 has a concave-convex structure on the opposite surface from the first transparent substrate 110 and the integrated reflectance of the surface of the antiglare layer 120 of the antiglare film 100 at a wavelength of 550 nm is less than or equal to 4%, even though the antiglare layer 120 has a haze value in a range of 3-15%, and also discovered a manufacturing method of the antiglare film and a transmission type liquid crystal display.

The antiglare film 100 provided with an antiglare layer 120 that has a low haze value in a range of 3-15% can be advantageously used as the antiglare film 100 of the embodiment of the invention. In a case where the haze value of the antiglare layer 120 exceeds 15%, sufficient contrast cannot be obtained. Furthermore, because a sufficient antiglare ability can be obtained due to a haze value of the antiglare layer 120, the effect of the invention cannot be sufficiently demonstrated. In a case where the haze value of the antiglare layer 120 is less than 3%, sufficient antiglare ability cannot be obtained.

In the antiglare film 100 of the embodiment of the invention, a value $R_A/H$, which is obtained by dividing an average diameter $R_A$ of the particles 122 contained in the antiglare layer 120 by an average thickness H of the antiglare layer 120, is preferably in the range of 0.3-0.8 and a refractive index n of the binder matrix 121 is preferably less than or equal to 1.47. The inventors have discovered that where a value $R_A/H$, which is obtained by dividing an average diameter $R_A$ of the particles 122 contained in the antiglare layer 120 by an average thickness H of the antiglare layer 120, is in the range of 0.30-0.80, most of the surface of the antiglare layer 120 can be covered with the binder matrix 121, without the particles 122 protruding on the surface of the antiglare layer 120, and the integrated reflectance of the surface of the antiglare layer 120 can be made less than or equal to 4% by setting the refractive index n of the binder matrix 121 to a value less than or equal to 1.47.

In a case where, the value $R_A/H$, which is obtained by dividing an average diameter $R_A$ of the particles 122 by an average thickness H of the antiglare layer 120, exceeds 0.8, the particles 122 are not covered by the binder matrix 121 and many particles 122 protrude from the antiglare layer 120. As a result, the integrated reflectance of the surface of the antiglare layer 120 is difficult to easily make less than or equal to 4% by setting the refractive index of the binder matrix 121 to a value less than or equal to 1.47. Further, in a case where the value $R_A/H$, which is obtained by dividing an average diameter $R_A$ of the particles 122 by an average thickness H of the antiglare layer 120, is less than 0.3, a concave-convex structure is difficult to form on the surface of the antiglare layer 120.

Further, in a case where the refractive index n of the binder matrix 121 is higher than 1.47, the integrated reflectance of the surface of the antiglare layer 120 is difficult to make less than or equal to 4%. Preferably, the lower the refractive index n of the binder matrix 121, the lower the integrated reflectance of the surface of the antiglare layer 120 can be, but taking into account that the antiglare layer 120 is formed at a low cost by using the material forming the binder matrix 121, it is preferred that the refractive index n of the binder matrix 121 be in a 1.40-1.47 range. In a case where the refractive index n of the binder matrix 121 is higher than 1.47, the effect of the invention cannot be sufficiently demonstrated.

In the present embodiment of the invention, the refractive index n of the binder matrix 121 means a refractive index of the film after the film has been formed from the binder matrix 121 in a form excluding the particles 122 contained in the antiglare layer 120. The refractive index n of the binder matrix 121 can be found by a Becke line detection method (immersion method).

The antiglare film 100 of the embodiment of the invention can be provided, if necessary, with a functional layer having antistatic performance, antifouling performance, electromagnetic shield performance, infrared absorbing performance, ultraviolet absorbing performance, and color correcting performance. Such functional layers may be used individually, or a plurality of such layers may be used. A functional layer can also combine a plurality of functions in one layer. The functional layer may be provided between the first transparent substrate 110 and antiglare layer 120 or on the side of the first transparent substrate 110 opposite to the antiglare layer 120. In the embodiment of the invention, a primer layer or an adhesive layer may be provided between the layers to improve adhesion between different layers.

A method for manufacturing the antiglare film 100 of the embodiment of the invention will be described below. With the method for manufacturing the antiglare film 100 of the embodiment of the invention, the antiglare layer 120 can be formed on the first transparent substrate 110 by a process including a step of coating a solution for forming the antiglare layer 120 that includes a material forming the binder matrix 121 that is curable by ionizing radiation and the particles 122 on the first transparent substrate 110 and forming a coating film on the first transparent substrate 110 and a curing step of curing the material forming the binder matrix 121 with ionizing radiation.

Glass or a plastic film can be used as the first transparent substrate 110 of the embodiment of the invention. The plastic film of suitable transparency and mechanical strength may be used. Examples of suitable films include polyethylene terephthalate (PET), triacetyl cellulose (TAC), diacetyl cellulose, acetyl cellulose butyrate, polyethylene naphthalate (PEN), a cycloolefin polymer, a polyimide, a polyethersulfone (PES), polymethyl methacrylate (PMMA), and a polycarbonate (PC). Among them, a triacetyl cellulose film can be used advantageously because of small birefringence and good transparency thereof. When the antiglare film 100 of the embodiment of the invention is provided on a liquid crystal display surface, triacetyl cellulose is especially preferred as the first transparent substrate 110.

The coating solution for forming the antiglare layer 120 preferably includes a material forming the binder matrix 121 curable by ionizing radiation and the particles 122.

In this case, a fluorine-containing material curable by ionizing radiation and a silicone-containing material curable by ionizing radiation can be advantageously used as the material forming the binder matrix 121. The fluorine-containing materials and silicone-containing materials have a low refractive index and the integrated reflectance of the surface of the antiglare layer 120 that is formed at a wavelength of 550 nm can be made less than or equal to 4%. Further, a copolymerizable material curable by ionizing radiation can be used in addition to the fluorine-containing material curable by ionizing radiation and silicone-containing material curable by ionizing radiation. An acrylic material that is a material curable by ionizing radiation can be also used. Examples of suitable acrylic materials include multifunctional (meth)acrylate compounds such as acrylic acid or methacrylic acid esters of polyhydric alcohols, and multifunctional urethane (meth) acrylate compounds such as synthesized from diisocyanates, polyhydric alcohols, and hydroxyl esters of acrylic acid and methacrylic acid. In addition, polyether resins, polyester resins, epoxy resins, alkyd resins, spyroacetal resins, polybutadiene resins, and polythiolpolyene resins that have an acrylate functional group can be also used as the materials curable by ionizing radiation.

A thermoplastic resin can be used in addition to the acrylic material that is a material curable by ionizing radiation as the material forming the binder matrix 121. Examples of suitable thermoplastic resins include cellulose derivatives such as acetyl cellulose, nitrocellulose, acetylbutyl cellulose, ethyl cellulose, and methyl cellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resin and copolymers thereof and methacrylic resin and copolymers thereof, polystyrene resins, polyamide resins, linear polyester resins, polycarbonate resins, silicone resins, and fluororesins. Adhesion of the first transparent substrate 110 and antiglare layer 120 can be improved by adding a thermoplastic resin. Further, by adding a thermoplastic resin, it is possible to suppress curling of the manufactured antiglare film.

In a case where ultraviolet radiation is used as ionizing radiation, a photopolymerization initiator is added to the coating solution for forming the antiglare layer 120. It is preferred that a photopolymerization initiator that has been present in the material forming the binder matrix be used. Examples of the photopolymerization initiator include benzoin and alkyl ethers thereof such as benzoin, benzoin methyl ether, benzoin ethyl ether, benzoin isopropyl ether, benzyl methyl ketal and alkyl ethers thereof. The amount of the photopolymerization initiator used is 0.5 part by weight to 20 parts by weight relative to the binder matrix forming material. The preferred amount is 1 part by weight to 5 parts by weight.

In a case where the particles 122 are used, inorganic particles such as powdered glass, glass beads, finely crushed glass fibers, titanium oxide, calcium carbonate, silicon dioxide (silica), aluminum oxide, and various clays or resin powders such as resin particles with an average diameter of 0.5 µm to 50 µm can be used. Examples of resin particles include acrylic particles, polystyrene particles, acryl-styrene copolymer particles, polycarbonate particles, polyurethane particles Nylon particles, polyethylene particles, polypropylene particles, silicone particles, polytetrafluoroethylene particles, polyvinylidene fluoride particles, and polyvinylidene chloride particles. Hollow, porous, and composite particles can be used without limitations as the particles 122. Particles of two or more appropriate types can be also used.

If necessary, a solvent can be added to the coating solution for forming the antiglare layer 120. By adding a solvent, it is possible to disperse uniformly the particles 122 in the material forming the binder matrix 121, or when the coating solution for forming the antiglare layer 120 is coated on the first transparent substrate 110, the solution viscosity can be adjusted to an adequate range.

In the embodiment of the invention, triacetyl cellulose is used as the first transparent substrate 110, and the antiglare layer is directly formed on the triacetyl cellulose film, without other functional layers being interposed therebetween. In a case where the antiglare layer 120 is directly provided, it is preferred that a mixed solvent of a solvent that dissolves the triacetyl cellulose film or causes swelling thereof and a solvent that neither dissolves the triacetyl cellulose film nor causes swelling thereof be used as the solvent for the coating solution for forming the antiglare layer 120. By using the mixed solvent, it is possible to obtain the antiglare film 100 with sufficient adhesion at the interface of the triacetyl cellulose film (first transparent substrate 110) and antiglare layer 120.

In this case, examples of the solvent that dissolves the triacetyl cellulose film or causes swelling thereof include ethers such as dibutylether, dimethoxymethane, dimethoxyethane, diethoxyethane, propylene oxide, dioxane, dioxolan, tiroxane, tetrahydrofuran, anisole, and penetol, some ketones such as acetone, methyl ethyl ketone, diethyl ketone, dipropyl ketone, diisobutyl ketone, cyclopentanone, cyclohexanone, methyl cyclohexanone, and ethyl cyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve, and cellosolve acetate. These solvents can be used individually or in combinations of two or more thereof.

Examples of the solvent that neither dissolves the triacetyl cellulose film nor causes swelling thereof include aromatic hydrocarbons such as toluene, xylene, cyclohexane, and cyclohexylbenzene, hydrocarbons such as n-hexane, and some ketones such as methyl isobutyl ketone and methyl butyl ketone, and some esters such as butyl acetate and isobutyl acetate. These solvents can be used individually or in combinations of two or more thereof.

In the antiglare layer 120 of the embodiment of the invention, an additive that is called a surface adjusting agent may be added to prevent the occurrence of coating defects such as repelling and unevenness in the antiglare layer 120 (coating film) that is formed by coating. Depending on the action thereof, the surface adjusting agent is also called a leveling agent, an antifoaming agent, an interface tension adjusting agent, and a surface tension adjusting agent, but all these agents act to decrease the surface tension of the coating film (antiglare layer 120) that is formed.

Examples of additives that are usually used as the surface adjusting agent include silicone-based additives, fluorine-containing additives, and acrylic additives. Examples of suitable silicone-based additives include derivatives having polydimethylsiloxane as the basic structure in which a side chain of the polydimethylsiloxane structure is modified. For example, a polyether-modified dimethylsiloxane can be used as the silicone additive. Compounds having a perfluoroalkyl group are used as fluorine-containing additives. Compounds having a basic structure obtained by polymerization of acryl monomer, methacryl monomer, or styrene monomer can be used as the acrylic additive. In the acrylic additive, a structure obtained by polymerization of acryl monomer, methacryl monomer, or styrene monomer may be a basic structure and a side chain may include a substituent such as an alkyl group, a polyether group, a polyester group, a hydroxyl group, or an epoxy group.

In addition to the above-described surface adjusting agent, other additives may be also added to the coating liquid for forming the antiglare layer 120 of the embodiment of the invention. However, it is preferred that these additives produce no adverse effect on the transparency and light diffusing ability of the antiglare layer that is formed. Examples of functional additives include an antistatic agent, an ultraviolet absorbing agent, an infrared absorbing agent, an antifouling agent, a water repellent, a refractive index adjusting agent, an adhesiveness increasing agent, a curing agent, and a dispersant. As a result, functions other than the antiglare function, such as an antistatic function, an ultraviolet absorption function, an infrared absorption function, an antifouling function, and a water repellent function can be imparted to the antiglare layer formed.

The coating liquid for forming the antiglare layer 120 of the embodiment of the invention is coated on the first transparent substrate 110 to form a coating film. A coating method using a roll coater, a reverse roll coater, a gravure coater, a knife coater, a bar coater, or a die coater can be used as a method for coating the coating liquid for forming the antiglare layer 120 on the first transparent substrate 110. Among these coaters, a die coater suitable for high-speed coating in a roll-to-roll system is preferably used. The concentration of solids in the coating liquid differs depending on the coating method. The concentration of solids may be about 30 wt. % to about 70 wt. %.

Figure 2:
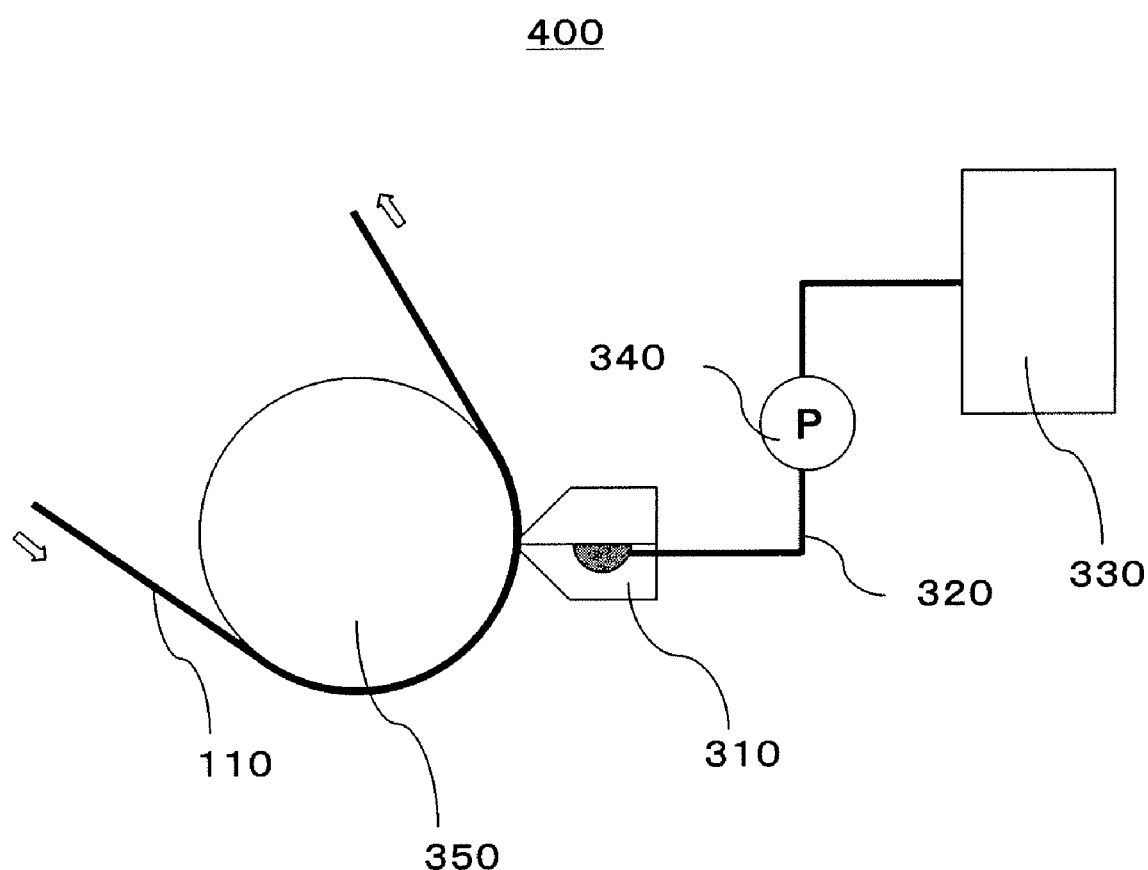
FIG. 2 is a schematic cross-sectional view illustrating a transmission type liquid crystal display using the antiglare film of the embodiment of the invention.

Next, a coating apparatus 400 using a die coater of the embodiment of the invention will be described below. FIG. 2 is a schematic cross-sectional view of the die coater coating apparatus 400 of the embodiment of the invention. As shown in FIG. 2, the die coater coating apparatus 400 of the embodiment of the invention has a structure in which a die head 310 is connected by a pipework 320 to a coating liquid tank 330, and the coating liquid for forming the antiglare layer 120 that is located in the coating liquid tank 330 is pumped by a transfer pump 340 into the die head 310. The coating liquid for forming the antiglare layer 120 that has been pumped into the die head 310 is ejected from a slit gap, and a coating film is formed on the first transparent substrate 110. By using the wound first transparent substrate 110 and a rotary roll 350, it is possible to form a coating film continuously on the first transparent substrate 110 by a roll-to-roll system.

The antiglare layer 120 is formed by irradiating the coating film obtained by coating the coating liquid on the first transparent substrate 110 with ionizing radiation. Ultraviolet radiation or electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has an energy of 50-1000 KeV. An electron beam having an energy of 100-300 KeV is more preferred.

Before or after a process of forming the antiglare layer 120 by curing, a drying process may be implemented. Further, curing and drying may be performed simultaneously. In particular, in a case where the coating liquid includes a material of the binder matrix 121, the particles 122 and the solvent, a drying process has to be implemented before irradiation with ionizing radiation in order to remove the solvent contained in the formed coating film. Examples of suitable drying means include heating, air blowing, and hot air blowing.

By setting the integrated reflectance of the surface of the antiglare layer 120 at a wavelength of 550 nm to a value less than or equal to 4% in the antiglare film 100 fabricated using the above-described method, it is possible to maintain antiglare ability and inhibit the reflection of external light at a low haze value of the antiglare layer 120 of 3-15%.

An image display device using the antiglare film of the embodiment of the invention will be described below. A transmission type liquid crystal display is explained below, but the antiglare film 100 of the embodiment of the invention can be provided not only on the transmission type liquid crystal display, but also on the surface of windows and on the surface of displays such as a CRT display, an electroluminescence display (ELD), a plasma display (PDP), a surface emission display (SED), and a field emission display (FED).

Figure 3A:
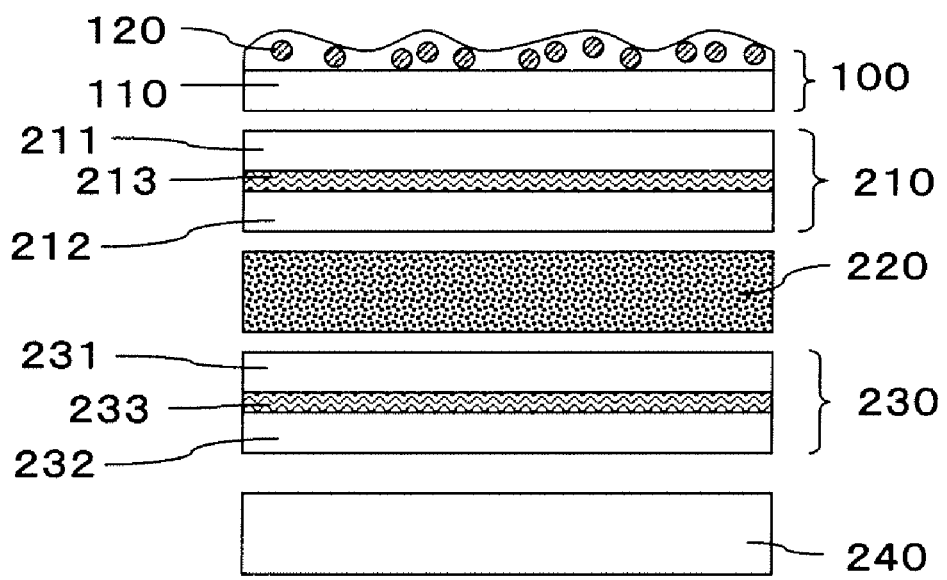
FIG. 3 is a schematic cross-sectional view illustrating a die-coater coating apparatus of the embodiment of the invention.
Figure 3B:
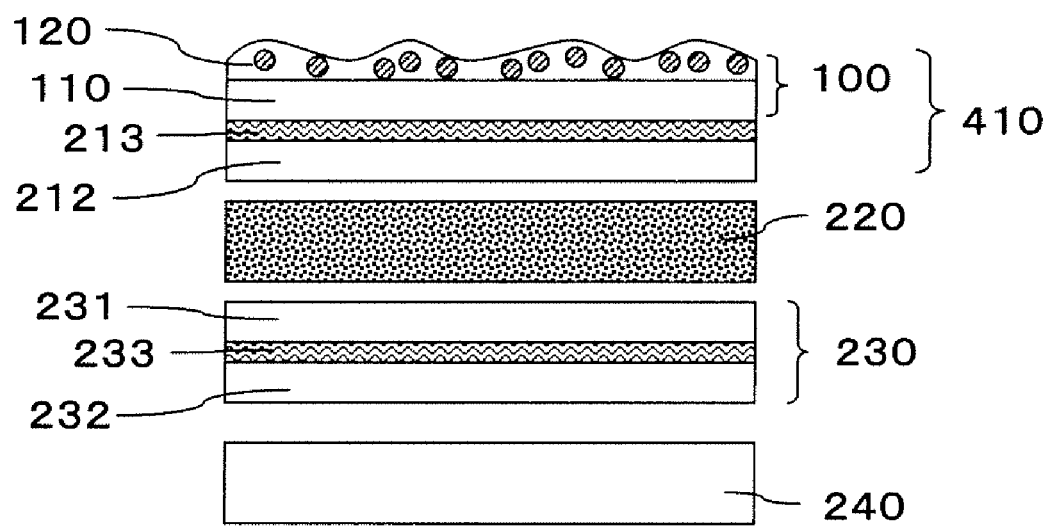

FIGS. 3A and 3B show transmission type liquid crystal displays 200 and 300 using the antiglare film 100 of the embodiment of the invention. As shown in FIG. 3A, the transmission-type liquid crystal display 200 of the embodiment of the invention is provided with the antiglare film 100, a polarizing plate 210, a liquid crystal cell 220, a polarizing plate 230, and a backlight unit 240. In this configuration, the side of the antiglare film 100 is the observation side, that is, the display surface.

The backlight unit 240 includes a light source and a light diffusion plate (none is shown in the figure). The liquid crystal cell 220 has a structure in which an electrode is provided on one transparent substrate, an electrode and a color filter are provided on the other transparent substrate, and a liquid crystal is sealed between the two electrodes (this structure is not shown in the figure). The first and second polarizing plates 210 and 230, which are provided so as to sandwich the liquid crystal cell 220, have a structure in which first and second polarizing layers 213 and 233 are sandwiched between the second to fifth transparent substrates 211, 212, 231, and 232. A transmission type liquid crystal display 200 is thus obtained in which the first transparent substrate 110 of the antiglare film 100 and the second transparent substrate 211 of the first polarizing plate 210 are provided separately from each other.

As shown in FIG. 3B, a transmission type liquid crystal display 300 of the embodiment of the invention has a structure in which a third polarizing plate 410 has a first polarizing layer 213 provided on the surface of the first transparent substrate 110 of the antiglare film 100 that is on the side opposite to the antiglare layer 120, and the first transparent substrate 110 serves as the transparent substrate of both the antiglare film 100 and the third polarizing plate 410.

Further, as shown in FIG. 3B, a transmission type liquid crystal display 400 of the embodiment of the invention is provided with a first polarizing layer 213 on the surface of the first transparent substrate 110 located on the opposite side from the surface where the antiglare layer 120 is located. In this case, for example, a stretched film of polyvinyl alcohol (PVA) having iodine added thereto can be used as the first polarizing layer 213. The first polarizing layer 213 in this case is sandwiched by the first transparent substrate 110 and third transparent substrate 212.

The transmission type liquid crystal displays 200 and 300 of the embodiment of the invention may include other functional elements. Examples of other functional elements include a diffusion film, a prism sheet, a luminance-increasing film for effectively using the light emitted from the backlight, and also a phase difference film for compensating the phase difference of the liquid crystal cell or polarizing plate, but the transmission type liquid crystal displays 200 and 300 of the embodiment of the invention are not limited to these elements.

In the transmission type liquid crystal displays 200 and 300 that use the antiglare film 100 of the embodiment of the invention, by setting the integrated reflectance of the surface of the antiglare layer 120 at a wavelength of 550 nm to a value less than or equal to 4%, it is possible to maintain antiglare ability and inhibit the reflection of external light at a low haze value of the antiglare layer 120 of 3-15%. In other words, the transmission type liquid crystal displays 200 and 300 that excel in visibility can be obtained.

EXAMPLE 1

Examples and comparative examples of the invention will be described below in greater detail.

As shown in FIG. 1, a triacetyl cellulose film (TD-80U, manufactured by Fuji Photo Film Co., Ltd.) was used as the first transparent substrate 100. In the coating liquid for forming the antiglare layer 120, 94.5 parts by weight of a silicone material curable by ionizing radiation, 5.0 parts by weight of Irgacure 184 (manufactured by Ciba-Geigy) as a polymerization initiator, and 0.5 part by weight of BYK 350 (manufactured by BYK Chemi Japan) as an acrylic additive were used as forming materials of the binder matrix 121. Further, acrylic particles, 10 parts by weight, with an average diameter of 5 μm and a refractive index of 1.49 were prepared as the particles 122. A mixed solvent containing 30 parts by weight of dioxolan and 70 parts by weight of toluene was used as the solvent. The components were mixed to produce a coating liquid for forming the antiglare layer 120.

The coating liquid for forming the antiglare layer 120 was coated on the triacetyl cellulose film by using the die coater coating device 400 and a coating film was obtained. The obtained coating film was dried and the solvent contained in the coating film was removed. The coating film was then cured by ultraviolet irradiation at 250 mJ/cm$^2$ with a high-pressure mercury lamp, and the antiglare film 100 was produced in which the antiglare layer 120 with a thickness of 7.5 μm was provided on the triacetyl cellulose film.

In Examples 2 to 4 and Comparative examples 1 to 3, the coating liquids for forming the antiglare layer 120 were produced by changing the material forming the binder matrix 121 so as to change the refractive index n of the binder matrix 121. In this case, correspondingly to the refractive index n of the binder matrix 121, the partiers 122 were selected with a refractive index such as to maintain a constant difference in the refractive index between the particles 122 and the binder matrix 121.

The content ratio of the particles 122 to the material forming the binder matrix 121 and the average diameter $R_A$ of the particles were identical to those of Example 1. As for a solvent of the coating liquid for forming the antiglare layer 120, a mixed solvent containing 30 parts by weight of dioxolan and 70 parts by weight of toluene was also used in Examples 2 to 4 and Comparative examples 1 to 3.

In Example 2, a silicon material curable by ionizing radiation that was different from the material used in Example 1 and Example 4 was used as the material forming the binder matrix 121 and acrylic particles different from those of Example 1 and Example 4 were selected.

In Example 3, a fluorine-containing material curable by ionizing radiation and silicon particles were used.

In Example 4, a silicon material curable by ionizing radiation that was different from the material used in Example 1 and Example 2 was used as the material forming the binder matrix 121 and acrylic particles different from those of Example 1 and Example 2 were selected.

In Comparative Example 1, an acrylic material curable by ionizing radiation was used as the material forming the binder matrix 121 and acryl-styrene copolymer particles were selected.

In Comparative Example 2, an acrylic material curable by ionizing radiation that was different from the material used in Comparative Example 1 and Comparative Example 3 was used as the material forming the binder matrix 121 and acryl-styrene copolymer particles that had an acryl-styrene copolymerization ratio different from that of Comparative Example 1 and Comparative Example 3 were selected.

In Comparative Example 3, an acrylic material curable by ionizing radiation that was different from the material used in Comparative Example 1 and Comparative Example 2 was used as the material forming the binder matrix and acryl-styrene copolymer particles that had an acryl-styrene copolymerization ratio different from that of Comparative Example 1 and Comparative Example 2 were selected.

The "integrated reflectance" and "antiglare ability" were measured by the following methods with respect to the antiglare films 100 obtained in Examples 1 to 4 and Comparative Examples 1 to 3.

(Integrated Reflectance)

The surface of the antiglare films 100 obtained in Examples 1 to 4 and Comparative Examples 1 to 3 onto which the antiglare layer 120 has not been laminated was rubbed with sandpaper and coated with a non-glossy black paint. The antiglare film 100 was then set in an integration sphere and the integrated reflectance of the antiglare layer 120 at an incidence angle of 5° of the light with a wavelength of 550 nm was measured using an automatic spectrometer (U-4100 produced by Hitachi High-Tech Corp.).

(Antiglare Ability)

The antiglare films 100 obtained in Examples 1 to 4 and Comparative Examples 1 to 3 were pasted onto a black plastic plate with a pressure-sensitive adhesive, observed from a distance of 1 m, and visually evaluated. In a case where the observer did not see his own face at all, the evaluation result was represented by a "double circle" symbol (◯◯), when the own face could be recognized, but the results were acceptable, the evaluation result was represented by a "circle" symbol (◯), and when the own face was clearly reflected, the evaluation result was represented by a "cross" symbol (x).

Table 1 shows the measurement results on the "refractive index n of the binder matrix 121", "average diameter $R_A$ of the particles 122", refractive index $n_A$ of the particles 122", "average thickness H of the antiglare layer 120", "haze value of the antiglare layer 120", and "integrated reflectance" that were obtained for the antiglare films 100 of Examples 1 to 4 and Comparative Examples 1 to 3. The evaluation results on the "antiglare ability" are also shown in Table 1. The average thickness H of the antiglare layer 120 was measured with an electronic micrometer (K351C, manufactured by Anritsu Corp.). The average diameter $r_A$ of the particles 122 was measured using a particle size distribution measurement device of a light scattering type (SALD-7000, manufactured by Shimadzu Corp.). The refractive index n of the binder matrix was measured by the Becke line detection method (immersion method) by using a sample obtained by coating, drying, and ultraviolet curing the forming material of the binder matrix 121 under the same conditions as those of Example 1, without the particles 122. The refractive index $n_A$ of the particles 122 was measured by the Becke line detection method (immersion method). The haze value was measured using a haze value meter (NDH2000, manufactured by Nippon Denshoku) according to JIS K7105.

TABLE 1

| | Refractive index n of binder matrix | Particles | | Average thickness H of antiglare layer (μm) | Haze (%) | Evaluation results | |
|---|---|---|---|---|---|---|---|
| | | Diameter rA (μm) | Refractive index nA | | | Integrated reflectance | Antiglare ability |
| Example 1 | 1.460 | 5.0 | 1.490 | 7.5 | 14 | 3.7 | ○○ |
| Example 2 | 1.465 | 5.0 | 1.495 | 7.5 | 14 | 3.8 | ○ |
| Example 3 | 1.438 | 5.0 | 1.470 | 7.5 | 14 | 3.5 | ○○ |
| Example 4 | 1.469 | 5.0 | 1.500 | 7.5 | 14 | 3.9 | ○ |
| Comparative Example 1 | 1.494 | 5.0 | 1.535 | 7.5 | 14 | 4.1 | X |
| Comparative Example 2 | 1.525 | 5.0 | 1.555 | 7.5 | 14 | 4.6 | X |
| Comparative Example 3 | 1.531 | 5.0 | 1.560 | 7.5 | 14 | 4.7 | X |

The comparison of antiglare films 100 obtained in Examples 1 to 4 and Comparative Examples 1 to 3 demonstrates that the antiglare films 100 of Examples 1 to 4 have higher antiglare ability.

What is claimed is:

1. An antiglare film comprising:
a transparent substrate; and
an antiglare layer, said antiglare layer being formed on said transparent substrate, having a concave-convex structure on the opposite surface of said antiglare layer from said transparent substrate, and including a binder matrix and particles, an integrated reflectance of said antiglare layer at a wavelength of 550 nm being less than or equal to 4%, a haze value of said antiglare layer being in the range of 3-15%, an average diameter of said particles $R_A$ being in the range of 0.5-50 μm, a value $R_A/H$, which is obtained by dividing said average diameter of said particles by an average thickness H of said antiglare layer, being in the 0.3-0.8 range, and a refractive index n of said binder matrix being less than or equal to 1.47.

2. A polarizing plate comprising:
said antiglare film according to claim 1; and
a polarizing layer which is formed on the opposite surface of said transparent substrate from said antiglare layer.

3. A transmission type LCD comprising:
said antiglare film according to claim 1;
a first polarizing plate;
a liquid crystal cell;
a second polarizing plate; and
a backlight unit, in the order of this description from an observer's side, said antiglare layer of said antiglare film being arranged as the surface of observer's side.

4. A transmission type LCD comprising:
a first polarizing plate;
a liquid crystal cell;
a second polarizing plate; and
a backlight unit, in the order of this description from an observer's side, said antiglare layer of said antiglare film being arranged as the surface of observer's side, said first polarizing plate being said polarizing plate according to claim 2.

5. A manufacturing method of an antiglare film, said method comprising:
coating a coating liquid for forming an antiglare layer which contains particles and a binder matrix forming material which cures by ionizing radiation on said transparent substrate to form a coated layer; and
exposing said coated layer to ionizing radiation to cure said binder matrix so that an antiglare film which has an integrated reflectance less than or equal to 4% at a wavelength of 550 nm and a haze value in the range of 3-15% is obtained, wherein
an average diameter of said particles $R_A$ is in the range of 0.5-50 μm, a value $R_A/H$, which is obtained by dividing said average diameter of said particles by an average thickness H of said antiglare layer, is in the 0.3-0.8 range, and a refractive index n of said binder matrix is less than or equal to 1.47.

6. The manufacturing method according to claim 5, wherein said coated layer is formed by a die coating method.

7. The antiglare film according to claim 1, wherein said antiglare layer is positioned on the outermost surface of said antiglare film.

8. The antiglare film according to claim 1, wherein said particles, individually or by aggregates of a plurality thereof, form a concave-convex structure on the surface, thereby forming concavities and convexities of the surface of said antiglare layer.

9. The antiglare film according to claim 1, wherein at least one of a fluorine-containing material which is curable by ionizing radiation or a silicone-containing material which is curable by ionizing radiation is used as a material which forms said binder matrix.

10. The antiglare film according to claim 1, wherein said antiglare layer is positioned on the outermost surface of said antiglare film, wherein said particles, individually or by aggregates of a plurality thereof, form a concave-convex structure on the surface, thereby forming concavities and convexities of the surface of said antiglare layer, and wherein at least one of a fluorine-containing material which is curable by ionizing radiation or a silicone-containing material which is curable by ionizing radiation is used as a material which forms said binder matrix.

11. The manufacturing method according to claim 5, wherein said antiglare layer is positioned on the outermost surface of said antiglare film.

12. The manufacturing method according to claim 5, wherein said particles, individually or by aggregates of a plurality thereof, form a concave-convex structure on the surface, thereby forming concavities and convexities of the surface of said antiglare layer.

13. The manufacturing method according to claim 5, wherein at least one of a fluorine-containing material which is curable by ionizing radiation or a silicone-containing material which is curable by ionizing radiation is used as a material which forms said binder matrix.

14. The manufacturing method according to claim 5, wherein said antiglare layer is positioned on the outermost surface of said antiglare film, wherein said particles, individually or by aggregates of a plurality thereof, form a concave-convex structure on the surface, thereby forming concavities and convexities of the surface of said antiglare layer, and wherein at least one of a fluorine-containing material which is curable by ionizing radiation or a silicone-containing material which is curable by ionizing radiation is used as a material which forms said binder matrix.

15. The antiglare film according to claim 1, wherein said average diameter of said particles $R_A$ is in the range of 0.5-5 μm.

16. The manufacturing method according to claim 5, wherein said average diameter of said particles $R_A$ is in the range of 0.5-5 μm.

17. The antiglare film according to claim 1, wherein a silicone-containing material which is curable by ionizing radiation is used as a material which forms said binder matrix.

18. The manufacturing method according to claim 5, wherein a silicone-containing material which is curable by ionizing radiation is used as a material which forms said binder matrix.

19. The antiglare film according to claim 1, wherein said particles are resin particles.

20. The manufacturing method according to claim 5, wherein said particles are resin particles.

* * * * *